United States Patent
Mannhardt et al.

(10) Patent No.: US 10,895,526 B2
(45) Date of Patent: Jan. 19, 2021

(54) MEASURING APPARATUS FOR ANALYZING A MEASURING MEDIUM

(71) Applicant: Endress+Hauser Conducta GmbH+Co. KG, Gerlingen (DE)

(72) Inventors: Joachim Mannhardt, Eschach (DE); Judith Falk, Leinfelden-Echterdingen (DE); Monika Heisterkamp, Ditzingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/189,371

(22) Filed: Nov. 13, 2018

(65) Prior Publication Data

US 2019/0145888 A1 May 16, 2019

(30) Foreign Application Priority Data

Nov. 13, 2017 (DE) .......................... 10 2017 126 612

(51) Int. Cl.
*G01J 3/26* (2006.01)
*G01N 21/25* (2006.01)
(Continued)

(52) U.S. Cl.
CPC .............. *G01N 21/255* (2013.01); *G01J 3/00* (2013.01); *G01N 21/31* (2013.01);
(Continued)

(58) Field of Classification Search
CPC . G01N 21/65; G01N 21/64; G01J 3/44; G01J 3/00; G01J 3/02; G01J 3/10; G01J 3/18; G01J 3/26; G01J 3/28
See application file for complete search history.

(56) References Cited

U.S. PATENT DOCUMENTS 5,510,895 A 4/1996 Sahagen
2006/0062696 A1* 3/2006 Chow ............... B01L 3/502746
422/400

(Continued)

FOREIGN PATENT DOCUMENTS

| DE | 202005011177 U1 | 11/2006 |
| DE | 102010001779 A1 | 8/2011 |
| DE | 102015122995 A1 | 7/2017 |

OTHER PUBLICATIONS

Search Report for German Patent Application No. 10 2017 126 612.7, German Patent Office, dated Jul. 16, 2018, 7 pp.

*Primary Examiner* — Abdullahi Nur
(74) *Attorney, Agent, or Firm* — Kelly J. Smith; Endress+Hauser (USA) Holding Inc.

(57) ABSTRACT

The present disclosure relates to a measuring apparatus for analyzing a measuring medium. The measuring apparatus includes a probe housing, a radiation source, and coupling and decoupling optics. The optics have a measurement window in the probe housing to direct radiation of the radiation source into a measuring region outside the probe housing and including the measuring medium, and to block measuring radiation from the measuring region. Via the optics, a receiving device detects measuring radiation and generates output data. An additional physical or chemical sensor is integrated into the probe housing and is designed to detect a measurand of the measuring medium and output measurement signals. An electronic measurement unit is configured to collect and process the output data of the receiving device and the measurement signals of the additional physical or chemical sensor.

19 Claims, 2 Drawing Sheets

(51) Int. Cl.
    *G01N 21/85*     (2006.01)
    *G01J 3/00*     (2006.01)
    *G01N 21/31*     (2006.01)
    *G01N 21/65*     (2006.01)
    *G01N 21/53*     (2006.01)
    *G01N 21/64*     (2006.01)
    *H04N 5/378*     (2011.01)

(52) U.S. Cl.
    CPC ....... *G01N 21/8507* (2013.01); *G01N 21/534* (2013.01); *G01N 21/645* (2013.01); *G01N 21/65* (2013.01); *G01N 2021/8528* (2013.01); *H04N 5/378* (2013.01)

(56) References Cited

U.S. PATENT DOCUMENTS

| | | |
|---|---|---|
| 2010/0035337 A1 | 2/2010 | Bahnemann et al. |
| 2010/0110437 A1* | 5/2010 | Furtaw ................... G01K 13/02 356/437 |
| 2013/0145818 A1 | 6/2013 | Allgäuer et al. |
| 2018/0085003 A1* | 3/2018 | Goldring ............. A61B 5/0022 |

\* cited by examiner

MEASURING APPARATUS FOR ANALYZING A MEASURING MEDIUM

CROSS-REFERENCE TO RELATED APPLICATION

The present application is related to and claims the priority benefit of German Patent Application No. 10 2017 126 612.7, filed on Nov. 13, 2017, the entire contents of which are incorporated herein by reference.

TECHNICAL FIELD

The present disclosure relates to a measuring apparatus for analyzing a measuring medium.

BACKGROUND

In order to monitor, control, and regulate production processes of the process industry and to control the quality of products and intermediate products of processes by means of either in-line measurements or on samples in the laboratory, a plurality of sensors are used. Various analysis sensors traditionally serve in process measurement technology and in the laboratory to determine the composition of measuring media, such as gases, gas mixtures, liquids, liquid mixtures, emulsions, suspensions, or solids and solid mixtures. Physical and chemical sensors that are designed to generate a measurement signal dependent upon an analysis measurand, such as a concentration of at least one analyte in the measuring medium, come into consideration as analysis sensors. An analyte refers to a substance contained in, or dissolved in, the measuring medium, which substance is to be identified and/or the concentration of which in the measuring medium is to be determined or monitored by the analysis sensor. Examples of analysis sensors are physical sensors, such as conductivity sensors, or chemical sensors, such as pH sensors, dissolved oxygen sensors, gas sensors, total organic carbon (TOC) sensors, or ion-selective electrodes.

Optical sensors, such as spectrometric sensors, or image sensors, such as cameras or hyperspectral cameras, which function without contact with the medium, have become more and more important in process analysis in recent times. In particular, they allow qualitative and/or quantitative determination of a broad spectrum of analytes, which allows the use of one and the same spectrometric or image sensor to determine a plurality of different measurands. A qualitative determination here and in the following is understood to mean the identification of an analyte, while a quantitative determination here and in the following refers to the determination of a concentration or a parameter comparable to the concentration, such as partial pressure, activity, weight, or volume fraction, of an analyte.

On the other hand, the data provided by spectrometric sensors or image sensors cannot always be interpreted easily, since a plurality of influencing variables, such as temperature fluctuations or the presence of interfering substances, the signals of which superpose the signals relevant to the measurand in the spectrum, can be included in the spectrum. In some cases, the situation may also arise that several analytes that are potentially present in the measuring medium and not all of which are accessible by spectroscopic measurement must be monitored in order to reliably control or regulate a process. In such cases, several different sensors are frequently used to detect measured values in the process. Among other things, this is disadvantageous because a corresponding number of connections must be provided on the process system, which can be problematic, e.g., in pharmaceutical and biotechnological processes where only small batches are produced, if sufficient space for several sensors and the associated process connections or fittings is not available. Moreover, the sensors are often arranged remotely from each other for lack of space, which is problematic when the measuring medium is inhomogeneous and/or the measurands to be detected fluctuate depending upon the location, so that measured values detected at different locations do not necessarily match.

Another method often used today for monitoring the product quality of a production process or for checking whether a cleaning process of a process system was performed successfully consists of taking samples from the process and conducting further measurements on the samples in the laboratory in addition to the in-line measurements directly in a process container, such as a fluid line or a reaction container or fermenter, or in a bypass line of the process system. This is generally time-consuming and error-prone, since the samples can change along the way from the process to the laboratory as a result of aging and changing environmental conditions during transport.

In both cases, it is complex for the user to consolidate the various measured values of the individual sensors or the measured values obtained from the samples and to derive from them the process or quality parameters that are relevant to the process monitoring or process regulation.

SUMMARY

It is therefore the aim of the present disclosure to specify an apparatus and a method which make possible for the user a simplified and reliable determination of various measured values and, where appropriate, of at least one analysis value dependent upon a chemical composition of a measuring medium and derived from data determined by various sensors.

This aim is achieved by the measuring apparatus according to claim 1 and the method according to claim 16. Advantageous embodiments are listed in the dependent claims.

The measuring apparatus according to the present disclosure for analyzing a measuring medium includes a probe housing, a radiation source, and coupling and decoupling optics. The optics have a measurement window in the probe housing to direct radiation of the radiation source into a measuring region outside the probe housing and including the measuring medium, and to block measuring radiation from the measuring region. Via the optics, a receiving device detects measuring radiation and generates output data. An additional physical or chemical sensor is integrated into the probe housing and is designed to detect a measurand of the measuring medium and output measurement signals. An electronic measurement unit is configured to collect and process the output data of the receiving device and the measurement signals of the additional physical or chemical sensor.

By arranging the at least one additional physical or chemical sensor together with the at least one measurement window, through which radiation of the radiation source is directed into the measuring medium and measuring radiation is directed, or redirected, from the measuring medium, in a common probe housing, a compact measuring probe is provided, which can be brought into contact with the measuring medium in order to measure several measurands.

In one embodiment, the electronic measurement unit can be configured to determine and output at least one analysis value using the output data of the receiving device and the measurement signals of the additional physical or chemical sensor. As a result, the user is immediately provided with meaningful analysis values, which the user does not need to determine from the output data of the optical receiving device and the measurement signals of the additional sensor.

The at least one analysis value can be displayed directly via a display device of the measuring apparatus, e.g., a display, and thus be available for a quality assessment of the process by the user. At the same time, the electronic measurement unit can also be configured to display, for informational purposes, the output data of the optical receiving device and the measured values derived from the measurement signals of the additional sensor. The electronic measurement unit can additionally or alternatively be configured to output the at least one analysis value directly to a process control or regulation device and/or to a laboratory information and management system (LIMS). If the measuring apparatus is installed in a process system in order to determine the at least one analysis value in a process medium, such as measuring medium, the process control can in this way directly use the analysis value output by the electronic measurement unit to document the process and/or to control the process, e.g., by controlling valves, actuators, or ventilators of the process system based upon the analysis value.

The receiving device can comprise a spectrometer, which is configured to split the detected measuring radiation into a spectrum and to register the generated spectrum by means of a detector, wherein the detector is configured to generate output data representing the registered spectrum to the electronic measurement unit. The receiving device can also comprise a multi-channel photometer or one or more spectral sensors. The radiation provided by the radiation source can be infrared radiation, e.g., comprising NIR (wavelength 780 nm to 3,000 nm) or MIR radiation (wavelength 3,000 nm to 50,000 nm), or UV/Vis radiation (wavelength 180 nm to 800 nm). The radiation directed into the measuring region can be converted in the measuring medium by absorption, fluorescence, or scattering, for example, so that the spectrum registered by the receiving device is an absorption, fluorescence, emission, or scattered light spectrum, or even a Raman spectrum.

The electronic measurement unit can be configured to qualitatively or quantitatively determine at least one analyte from the registered spectrum. Qualitative determination of an analyte is understood to mean that the electronic measurement unit determines whether a certain analyte is present in the measuring medium. Quantitative determination of an analyte refers to the determination of a concentration of the analyte in the measuring medium or of a measurand equivalent to the concentration (e.g., activity, partial pressure, percentage in weight or mole percent). This means that the electronic measurement unit can be configured to identify at least one analyte or to determine its concentration from the registered spectrum and/or from a color of the measuring medium and/or to generate a measurement signal dependent upon the concentration or upon a measurand equivalent to the concentration.

The receiving device can comprise an image sensor, e.g., a charge-coupled device (CCD) sensor or a complementary metal oxide semiconductor (CMOS) sensor, wherein the coupling and decoupling optics are designed to generate an optical image of the measuring region on the image sensor, and wherein the receiving device is configured to generate output data representing the image detected by means of the image sensor to the electronic measurement unit. The receiving device thus forms a camera that detects a spatially-resolved image of the measuring medium. The image sensor can additionally be designed, or configured, to detect, in a spatially-resolved manner, spectral information of the optical image generated on the image sensor. In this case, the receiving device forms a hyperspectral camera. The receiving device can also have one or more individual detectors.

In one embodiment, the at least one additional sensor can be a temperature sensor. With the additional temperature information, a spectrum detected by means of the receiving device can, for one, be analyzed more precisely. For example, when measuring humidity, characteristic bands in the spectrum can be shifted to higher or lower wavelengths, depending upon the temperature. A change in the aggregation state of the measuring medium can also influence the spectrum. From the spectrum and the measured temperature values, humidity of the measuring medium and/or an aggregation state of the measuring medium, for example, can thus be determined as an analysis value.

In another embodiment, the at least one additional sensor can be an analysis sensor. The analysis sensor can, for example, be an inductive or conductive conductivity sensor, a pH sensor, e.g., a potentiometric pH sensor or an ion-sensitive field-effect transistor (ISFET) pH sensor, an ion-selective electrode, a gas sensor, or a sensor for detecting a gas dissolved in a measuring liquid, e.g., a dissolved oxygen sensor. If the analysis sensor is a gas sensor or a sensor for detecting a dissolved gas, it can function in accordance with an optical (quenching) or an amperometric principle. The analysis sensor can also be a photometric sensor, which detects the absorption of radiation of one or more given wavelengths in the measuring medium, e.g., in order to determine sum parameters, such as the spectral absorption coefficient (SAC) or the TOC.

If the receiving device is designed, as described further above, to detect a ultraviolet-visible spectroscopy or ultraviolet-visible spectrophotometry (UV/Vis) spectrum, the measuring apparatus can be designed to qualitatively or quantitatively determine several analytes, where appropriate, based upon the output data of the receiving device representing the spectrum, i.e., to identify the analytes and/or to determine their concentration or a variable equivalent to the concentration. For example, the measuring apparatus for checking whether a flushing liquid serving as a measuring medium still contains contaminations or residues of cleaning media. Flushing liquid is typically flushed through a process system during a cleaning in place (CIP) cleaning process or a sterilization in place (SIP) sterilization process ( ), or at the end of or after carrying out such a process. If the measuring medium still contains contaminations or residues of cleaning media, the measuring apparatus can be designed to identify one or more analytes present in the flushing fluid based upon the output data and/or to determine the concentration of one or more analytes, and can additionally determine a measured TOC value.

The measuring apparatus can have more than one additional physical or chemical sensor. In one example, the measuring apparatus can comprise a temperature sensor and at least one analysis sensor, in addition to the optical measuring apparatus with the radiation source, the coupling and decoupling optics, and the receiving device. The electronic measurement unit is connected to the temperature sensor and to the at least one analysis sensor and is configured to receive and process measurement signals of the temperature sensor and of the analysis sensor. In this case, the electronic measurement unit can be designed to determine and output the analysis value using the output data of the receiving device and the measurement signals of the temperature sensor and of the at least one analysis sensor. The additional at least one analysis sensor, in a particularly suitable variant for monitoring a cleaning process, e.g., a CIP or SIP process, in a process system, can be a conductivity sensor. By means of the receiving device comprising a spectrometer, the presence of contaminations can thus be monitored, and the conductivity of the cleaning medium or of a flushing fluid flushed through the process system after cleaning can be detected by means of the conductivity sensor as an additional indicator of the success of the cleaning process. If the cleaning process comprises several successive steps, in which the system is respectively flushed with different cleaning agents, the presence or a concentration of one or more contaminations and/or the presence, or a concentration of compounds of the cleaning agent flushed through the system in the previous step, can, for example, be determined based upon the combined data of the receiving device and the conductivity sensor as analysis values. Based upon the time curve of these analysis values, the end of the cleaning step can be determined. This can preferably take place automatically by means of a process control designed to receive and analyze the analysis values.

The receiving device, the radiation source, and the electronic measurement unit can be accommodated in a housing separate from the probe housing. In this case, the coupling and decoupling optics can comprise one or more light guides, via which the radiation from the radiation source and the measuring radiation can be transmitted between the probe housing and the separate housing. In order to transmit the electrical measurement signals of the additional physical or chemical sensor, the additional sensor arranged in the probe housing can be connected to the electronic measurement unit via a wired or wireless communications link. It is also possible in one embodiment for at least a part of the electronic measurement unit to be integrated into the probe housing of the measuring apparatus and for another part of the electronic measurement unit to be arranged in the separate housing and to be connected for communication to the part integrated into the probe housing. It is also possible for the electronic measurement unit to be accommodated together with the radiation source and the receiving device in the probe housing. In this case, the light guides can be omitted.

The measuring apparatus can be designed as an in-line measuring device and, as such, can be integrated either directly into a process container, e.g., a line conducting a process medium or a reaction container, such as a fermenter or a drying container, or into a bypass line. The measuring apparatus can, for example, comprise a connection means, such as a connection apparatus, which is connected to the probe housing, for connecting the probe housing to a process container which contains the measuring medium, wherein the measuring region is located within a volume area of the process container, said volume area containing the measuring medium. The connection means can comprise a process connection, which can be affixed to a complementary connection of a process container, such as a pipe carrying the measuring medium or of a reaction container containing the measuring medium, e.g., a fermenter.

The electronic measurement unit can be configured to determine the analysis value by means of a chemometric model, which may be based upon a data, information, or sensor fusion process.

The at least one analysis value can be a value of a process parameter, a quality statement, such as a value of a quality parameter, an identification of one or more analytes in the measuring medium, or a concentration of one or more analytes in the measuring medium.

The electronic measurement unit can, as already mentioned above, be connectable to a process control and be configured to output the analysis value as a digital signal to the process control or an LIMS in accordance with a communication protocol that can be processed by the process control.

The present disclosure also comprises a method for determining at least one analysis value dependent upon a chemical composition of a measuring medium. The method includes steps of radiating radiation of a radiation source into the measuring medium, which radiation is converted into measuring radiation by interaction with the measuring medium, and receiving the measuring radiation by means of a receiving device and generating output data based upon the received measuring radiation by means of the receiving device. The method also includes steps of detecting measured values of a measurand of the measuring medium by means of at least one additional physical or chemical sensor and generating measurement signals representing the measured values, and detecting the output data of the receiving device and the measurement signals of the at least one physical or chemical sensor by an electronic measurement unit. Further, the method includes determining, by means of the electronic measurement unit, the analysis value using the output data of the receiving device and the measurement signals of the additional physical or chemical sensor.

The measuring apparatus described above can be used in the method. In the method, the analysis value can, in particular, serve a higher-level process control for controlling and/or regulating a process, wherein a process medium of the process to be controlled or regulated serves as measuring medium. The analysis value can, in this method, be a value of a process parameter or a quality parameter or qualitative information about the presence of one or more analytes in the measuring medium, or a concentration of one or more analytes in the measuring medium.

BRIEF DESCRIPTION OF THE DRAWINGS

The present disclosure is explained in further detail below on the basis of the exemplary embodiments shown in the figures.

DETAILED DESCRIPTION

Figure 1:
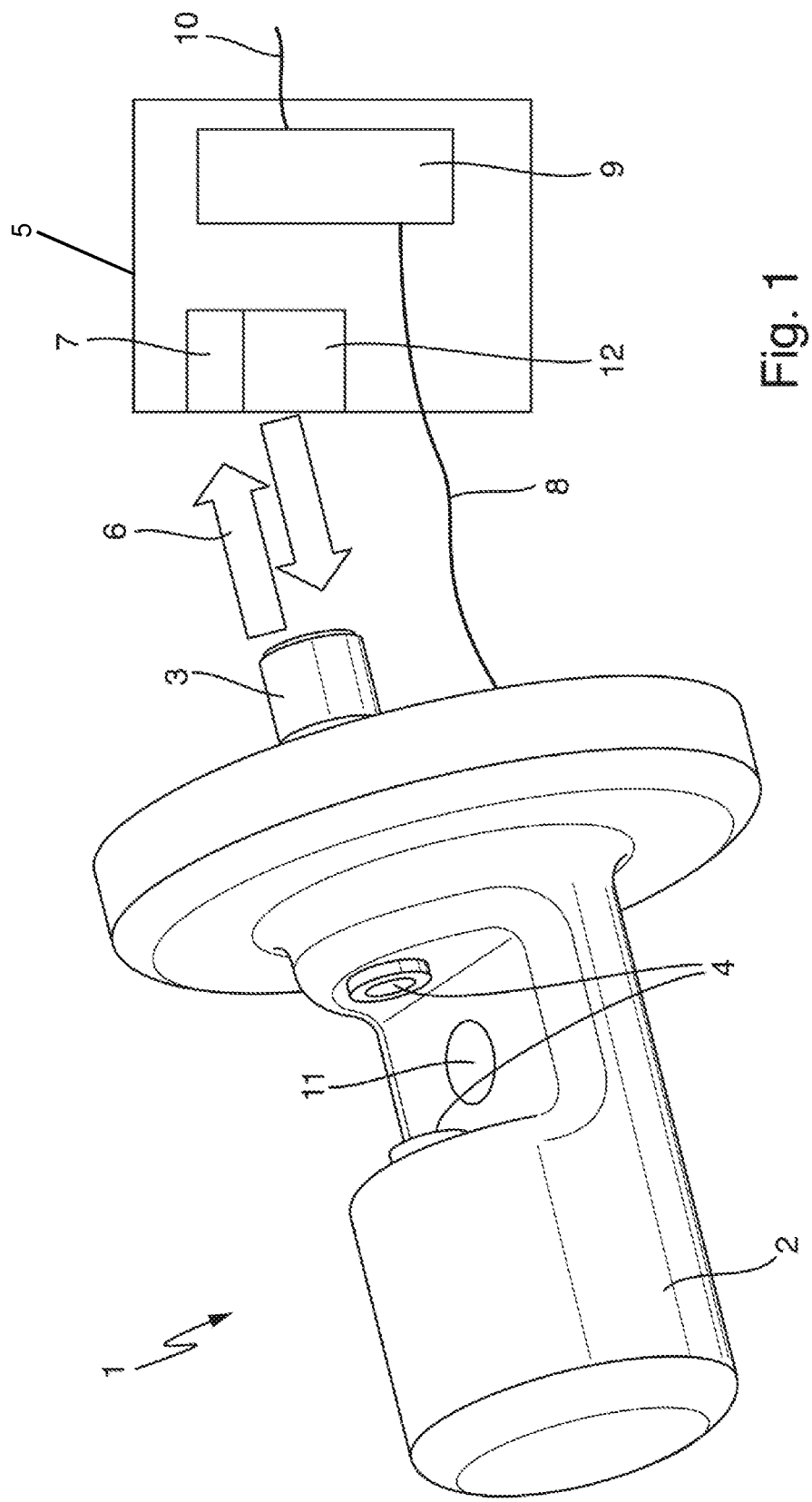
FIG. 1 shows a first example of a measuring apparatus with a measuring probe designed to detect several measurands.

FIG. 1 shows a first example of a measuring apparatus 1 configured to detect spectrometric measured data of a measuring medium and, at the same time, by means of a physical or chemical sensor, measured values of another measurand. The measuring apparatus 1 comprises a measuring probe that can be immersed in the measuring medium, with a probe housing 2 and a separate additional housing 5. In its front section, the probe housing 2 has an immersion region provided for immersing into the measuring medium, which immersion region is divided into a front cylindrical section, a center section with a reduced, circular-segment-shaped cross-section, and a rear cylindrical, section. The center section serves as a measuring region and is filled by the measuring medium when the immersion region is immersed into the measuring medium. At the transitions between the two outer sections of the immersion region and the measuring region, the probe housing 2 has opposite wall regions, which extend substantially orthogonally to the cylinder axis of the probe housing 2 and in which a measurement window 4 is respectively embedded, such that the two measurement windows 4 are aligned with and located opposite each other.

In the additional housing 5, which is only indicated schematically in FIG. 1, a radiation source 7 and a receiving device 12, which is connected to the measuring probe via coupling and decoupling optics 3, which comprise light guides 6 in addition to the measurement windows 4, are arranged. The light guides 6 connect the measuring probe to a radiation source 7 arranged in the housing 5 and to a receiving device 12. A data output of the receiving device 12 is connected to an input of an electronic measurement unit 9 also arranged in the housing 5.

The section of the immersion region of the probe housing 2 serving as the measuring region has a wall region which extends orthogonally to the two wall regions with the measurement windows 4 and in which an additional sensor 11 is arranged. In the present example, the sensor is a temperature sensor. This temperature sensor is electrically connected via the line 8 to the electronic measurement unit 9 arranged in the housing 5 and is designed to transmit temperature measurement signals via the line 8 to the electronic measurement unit 9.

In order to detect spectrometric measured data, the light guides 6 guide radiation of the radiation source 7 to one of the measurement windows 4, via which the radiation is coupled into the measuring region. In the measuring region, the radiation is converted to measuring radiation by interaction with the measuring medium. The measuring radiation is directed, or redirected, by the opposite measurement window 4 and finds its way via the light guide 6 back into the housing 5, and is directed from there to the receiving device 12. In the present example, the receiving device 12 comprises a spectrometer, which splits the received measuring radiation into a spectrum and register the generated spectrum by means of a detector. This detector converts the spectrum into digital output data, which are output by the receiving device 12 to the electronic measurement unit 9.

The electronic measurement unit 9 comprises a microprocessor and a data store, in which is stored, among other things, an operating program which serves to collect and process data of the receiving device 12 and measurement signals of the sensor 11. The electronic measurement unit 9 can, for example, be designed to determine from the data of the receiving device 12 whether a certain analyte is present in the measuring medium. Additionally or alternatively, the electronic measurement unit can be designed to determine, by means of the operating program, a concentration of a certain analyte or a sum parameter, such as TOC or SAC, from the data of the receiving device 12. The electronic measurement unit 9 is additionally designed to determine a temperature of the measuring medium, based upon the measurement signals of the sensor 11. The electronic measurement unit 9 additionally has a program by means of which it determines an analysis value from the data of the receiving device 12 and the measurement signals of the sensor 11, e.g., a measured value of an analyte concentration that is standardized based upon the temperature of the measuring medium.

Via a line 10, the electronic measurement unit 9 can be connected to a higher-level process control (not shown). The electronic measurement unit 9 can comprise a communications circuit and/or communications software, which serves to output, via the line 10, measured values or analysis values, determined by the electronic measurement unit 9, in the form of a signal in accordance with a communications protocol that can be processed by the process control.

Figure 2:
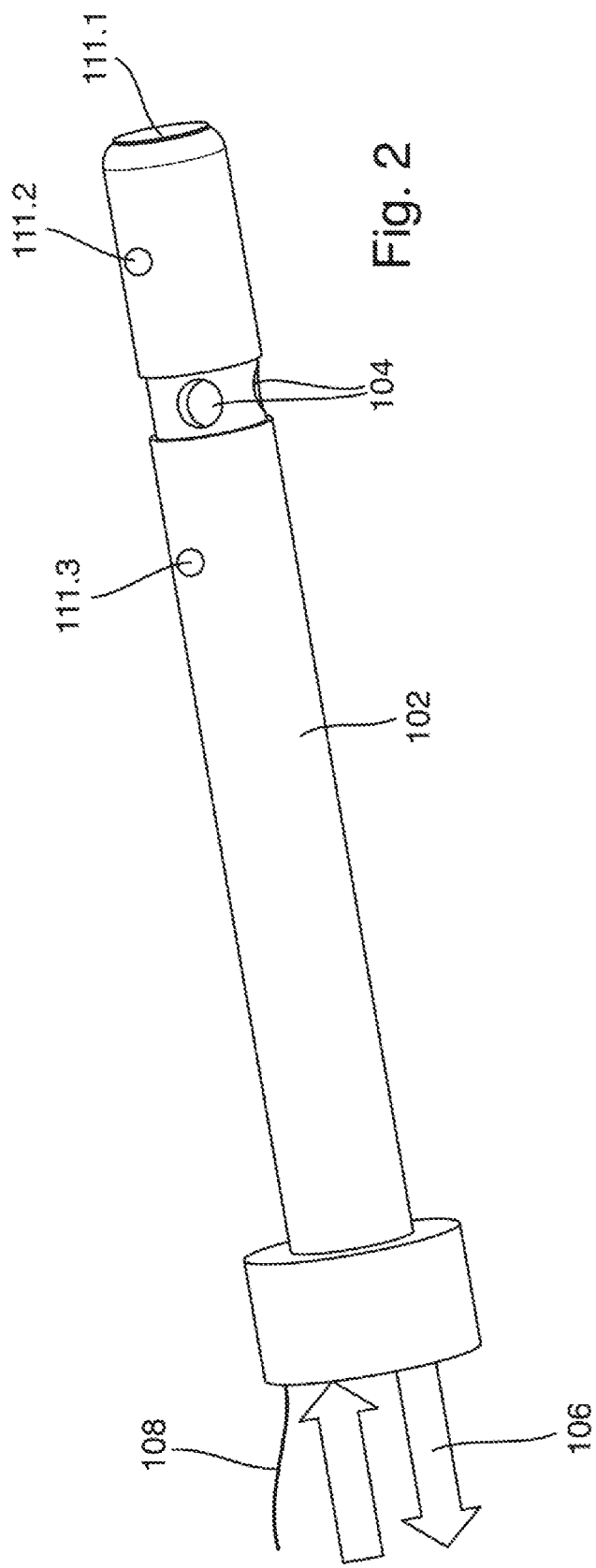
FIG. 2 shows a measuring probe according to a second example for use in a measuring apparatus in order to detect several measurands.

FIG. 2 schematically shows a measuring probe 102 according to a second exemplary embodiment. This measuring probe 102 can be connected to a separate housing, which contains an electronic measurement unit, as well as a radiation source and a receiving device, which can respectively be designed to be completely analogous to the respective parts of the measuring apparatus shown in FIG. 1 that were already described with reference to FIG. 1.

The measuring probe has a cylindrical probe housing 102, which has, in a front section provided for immersion in a measuring medium, several measurement windows 104, through which radiation of a radiation source sent via light guides 106 can be directed, or redirected, from the probe housing 102, and measuring radiation from the measuring medium can be directed back into the probe housing 102. The measuring radiation can be guided via light guides 106 to a receiving device arranged in the separate housing. At points 111.1, 111.2, 111.3 in the immersion region of the probe housing 102, additional chemical or physical sensors can be arranged. For example, a conductive conductivity sensor can be arranged at point 111.1, and a temperature sensor can be arranged at point 111.2.

The electronic measurement unit (not shown in FIG. 2) of the measuring apparatus can be designed to receive and process measurement signals of the sensors transmitted via the cable connection 108 and spectroscopic data generated by the receiving device based upon the measuring radiation. From these received signals and data, the electronic measurement unit can, on the one hand, determine measured values of the temperature and of the conductivity of the measuring medium and can, on the other hand, based upon these data, identify one or more analytes or determine a concentration of one or more analytes in the measuring medium. Additionally, the electronic measurement unit can determine analysis values from the measurement signals and the spectroscopic data, e.g., quality parameters or process parameters.

In the following, an application of the measuring apparatus with the measuring probe shown in FIG. 2 is described in more detail.

Many process systems are subjected to a cleaning process prior to carrying out a production process, e.g., a CIP process, in which one or more cleaning media, e.g., strong alkaline solutions, are flushed through the process system at increased temperatures. This process can be conducted in several steps or stages, wherein a different cleaning medium is flushed through the system in each stage. In traditional CIP processes, the duration of the individual flushing steps is predetermined. At the end, the system is flushed with ultrapure water, and the conductivity of the ultrapure water is measured by means of a conductivity sensor. The measured conductivity is compared to a stored target value for the conductivity of ultrapure water. If the measured conductivity deviates from the stored target value, the cleaning is classified as not successful, and the CIP process must be conducted again, and sometimes, with all of the prescribed stages.

Using a measuring apparatus with the measuring probe shown in FIG. 2, a more efficient cleaning of a process system using a CIP process can be conducted. During the CIP process, the measuring probe is integrated into the process system so that the immersion region of the probe housing 102 is immersed in the cleaning medium. In the cleaning medium, the probe detects measuring radiation, which is converted into a spectrum by means of the receiving device. The spectrum is output in the form of output data from the receiving device to the electronic measurement unit. The temperature sensor 111.2 and the conductivity sensor 111.1 detect measured temperature and conductivity values in the cleaning medium. From the spectrum, conclusions can be drawn regarding the presence of contaminations and residues of the cleaning medium flushed through the system in a previous process step. The conductivity also contains information regarding the contamination of the medium currently flowing through the system. In this case, substances can be proven or identified specifically on the basis of the spectrometric data, while the conductivity indicates residual contaminations in a non-specific manner.

A combination of both sensors can thus provide complementary pieces of information. In order to use this for monitoring cleaning, the electronic measurement unit, by means of an algorithm based upon a chemometric model, e.g., based upon statistical methods or data fusion models, determines, from the spectrometric data and the measured conductivity data, an analysis value that is a measure of the progress of the cleaning of the process system. If the analysis value determined in this way reaches a value within a predefined tolerance range, e.g., if it falls below a predefined threshold value, the electronic measurement unit classifies the current cleaning step as successfully completed and displays this or forwards this information to a process control carrying out the cleaning. Then, the carrying out of the next cleaning step can be started. If the current cleaning step was the final flushing step with ultrapure water, the information about the successful completion of the current cleaning step can at the same time serve as information about the successful completion of the cleaning process. Then, the carrying out of the actual production process in the cleaned system can start.

In this way, time can be saved, e.g., in case the cleaning has already been successfully completed before the conventionally predetermined time for a CIP cleaning or a CIP process step expires. In case the traditionally predetermined time for a CIP cleaning has not yet achieved the desired result, the cleaning step or the entire process can be continued on the basis of the measured data of the measuring apparatus, despite the expiration of the time. No time is lost by flushing with ultrapure water and measuring the conductivity of the ultrapure water. At the same time, a significant cost savings can result, since it can no longer happen, as in traditional processes, that all cleaning steps have to be started again from the beginning after completion of a CIP process if it is first realized during the final flushing step that the cleaning was not successful. The measuring apparatus according to the present disclosure thus optimizes traditional processes and serves to increase the productivity of a process system.

The invention claimed is:

1. A measuring apparatus for analyzing a measuring medium, comprising:
    a probe housing;
    a radiation source;
    coupling and decoupling optics, which have at least one measurement window arranged in the probe housing and which are configured to couple radiation of the radiation source into a measuring region which is arranged outside the probe housing and in which the measuring medium is located, and to decouple measuring radiation from the measuring region;
    a light detection unit configured to detect, via the coupling and decoupling optics, measuring radiation from the measuring region and to generate output data from the detected measuring radiation;
    wherein the radiation source and the light detection unit are housed in a housing separate from the probe housing;
    at least one additional physical or chemical sensor which is integrated into the probe housing and which is configured to detect a measurand of the measuring medium and to output values of the measurand as measurement signals; and
    a light processing unit which is connected to the light detection unit and configured to collect and process the output data of the light detection unit, and wherein the light processing unit is connected to the additional physical or chemical sensor and configured to collect and process the measurement signals of the additional physical or chemical sensor.

2. The measuring apparatus according to claim 1, wherein the light processing unit is configured to determine and output at least one analysis value using the output data of the light detection unit and the measurement signals of the additional physical or chemical sensor.

3. The measuring apparatus according to claim 1, wherein the light detection unit includes a spectrometer, which is configured to split the detected measuring radiation into a spectrum and to register the generated spectrum by means of a detector, wherein the detector is configured to generate output data representing the registered spectrum to the light processing unit.

4. The measuring apparatus according to claim 3, wherein the light processing unit is configured to identify at least one analyte from the registered spectrum or to determine its concentration.

5. The measuring apparatus according to claim 1, wherein the light detection unit includes an image sensor, wherein the coupling and decoupling optics are designed to generate an optical image of the measuring region, and wherein the light detection unit is configured to generate output data representing the optical image detected by means of the image sensor to the light processing unit.

6. The measuring apparatus according to claim 5, wherein the image sensor is a CCD sensor or a CMOS sensor.

7. The measuring apparatus according to claim 1, wherein the at least one additional physical or chemical sensor is a temperature sensor.

8. The measuring apparatus according to claim 1, wherein the at least one additional physical or chemical sensor is an analysis sensor.

9. The measuring apparatus according to claim 8, wherein the analysis sensor is a conductivity sensor, a pH sensor, an ion selective electrode, or a dissolved oxygen sensor.

10. The measuring apparatus according to claim 2, wherein the measuring apparatus includes a temperature sensor and at least one analysis sensor, wherein the electronic measurement unit is connected to the temperature sensor and to the at least one analysis sensor and is configured to receive and process measurement signals of the temperature sensor and of the analysis sensor and to determine and output the analysis value using the output data of the light detection unit and the measurement signals of the temperature sensor and of the at least one analysis sensor.

11. The measuring apparatus according to claim 1, wherein at least a part of the light processing unit is integrated into the probe housing of the measuring apparatus.

12. The measuring apparatus according to claim 1, wherein the measuring apparatus is configured as an in-line measuring device.

13. The measuring apparatus according to claim 11, wherein the measuring apparatus includes a connection apparatus, which is connected to the probe housing, for connecting the probe housing to a process container containing the measuring medium, wherein the measuring region is located within a volume area of the process container, said volume area containing the measuring medium.

14. The measuring apparatus according to claim 13, wherein the connection apparatus includes a process connection configured for attachment to a complementary connection of a process container.

15. The measuring apparatus according to claim 1, wherein the light processing unit is configured to determine the analysis value using a chemometric model.

16. The measuring apparatus according to claim 2, wherein the at least one analysis value is a value of a process parameter or quality parameter, qualitative information about the presence of one or more analytes in the measuring medium, or a concentration of one or more analytes in the measuring medium.

17. The measuring apparatus according to claim 2, wherein the light processing unit is connectable to a process control or a laboratory information and management system (LIMS) and is configured to output the analysis value as a digital signal to the process control or the LIMS in accordance with a communication protocol that can be processed by the process control or the LIMS.

18. A method for determining at least one analysis value corresponding to a chemical composition of a measuring medium, comprising: radiating radiation of a radiation source into the measuring medium, which radiation is converted into measuring radiation by interaction with the measuring medium; receiving the measuring radiation at a light detection unit and generating output data based upon the received measuring radiation using the light detection unit; detecting measured values of a measurand of the measuring medium using at least one additional physical or chemical sensor and generating measurement signals representing the measured values; detecting the output data of the light detection unit and the measurement signals of the at least one physical or chemical sensor by a light processing unit; and determining, using the light processing unit the analysis value using the output data of the receiving device light detection unit and the measurement signals of the additional physical or chemical sensor, wherein a probe housing houses the additional physical or chemical sensor and is separate from an additional housing that houses the radiation source.

19. The method according to claim 18, wherein the at least one analysis value is a value of a process parameter or quality parameter, qualitative information about the presence of one or more analytes in the measuring medium, or a concentration of one or more analytes in the measuring medium.

* * * * *